June 20, 1944.  R. O. ANDERSON  2,351,654

DRAW-WORKS

Filed April 7, 1941  3 Sheets-Sheet 1

Inventor
R. O. ANDERSON
By
E. J. Hardway
Attorney

June 20, 1944.  R. O. ANDERSON  2,351,654

DRAW-WORKS

Filed April 7, 1941  3 Sheets-Sheet 3

Inventor
REXFORD O. ANDERSON
By
E. V. Hardway
Attorney

Patented June 20, 1944

2,351,654

UNITED STATES PATENT OFFICE 2,351,654

DRAW WORKS

Rexford O. Anderson, Tulsa, Okla.

Application April 7, 1941, Serial No. 387,166

6 Claims. (Cl. 254—187)

This invention relates to draw-works particularly adapted for use in well drilling equipment.

The invention embodies a hoist adapted to be driven through a hydraulic transmission and controlled by a hydraulic brake.

An object of the invention is to provide a hydraulic transmission through which a hoist drum may be driven to elevate a load.

Another object of the invention is to provide a hydraulic counter-directional power transmission means which may be utilized as a brake to control the descent of the load, without declutching the motor from the driving element.

The invention also embodies novel means for controlling the hydraulic transmission in elevating the load and for controlling said transmission to accomplish a braking action during the descent of the load.

More specifically one form of the invention embodies hoisting equipment having its entire speed ratio mechanism axially aligned and mounted on a single shaft with hydraulic transmission means effective to deliver variable torque, from zero up to the maximum torque available, to its driven element with constant speed of its driving element, said hydraulic transmission means being adapted to deliver power, in multiples of its torque capacity to raise a load, and also adapted to dissipate the energy of a descending load in any degree from zero up to multiples of its dissipating capacity, whereby the load may be raised and lowered with constant motor driving speed without declutching the motor from the driving element.

With the above and other objects in view the invention has particular relation to certain features of construction, operation and arrangement of parts, an example of which is given in this specification and illustrated in the accompanying drawings, wherein—

Figure 1:
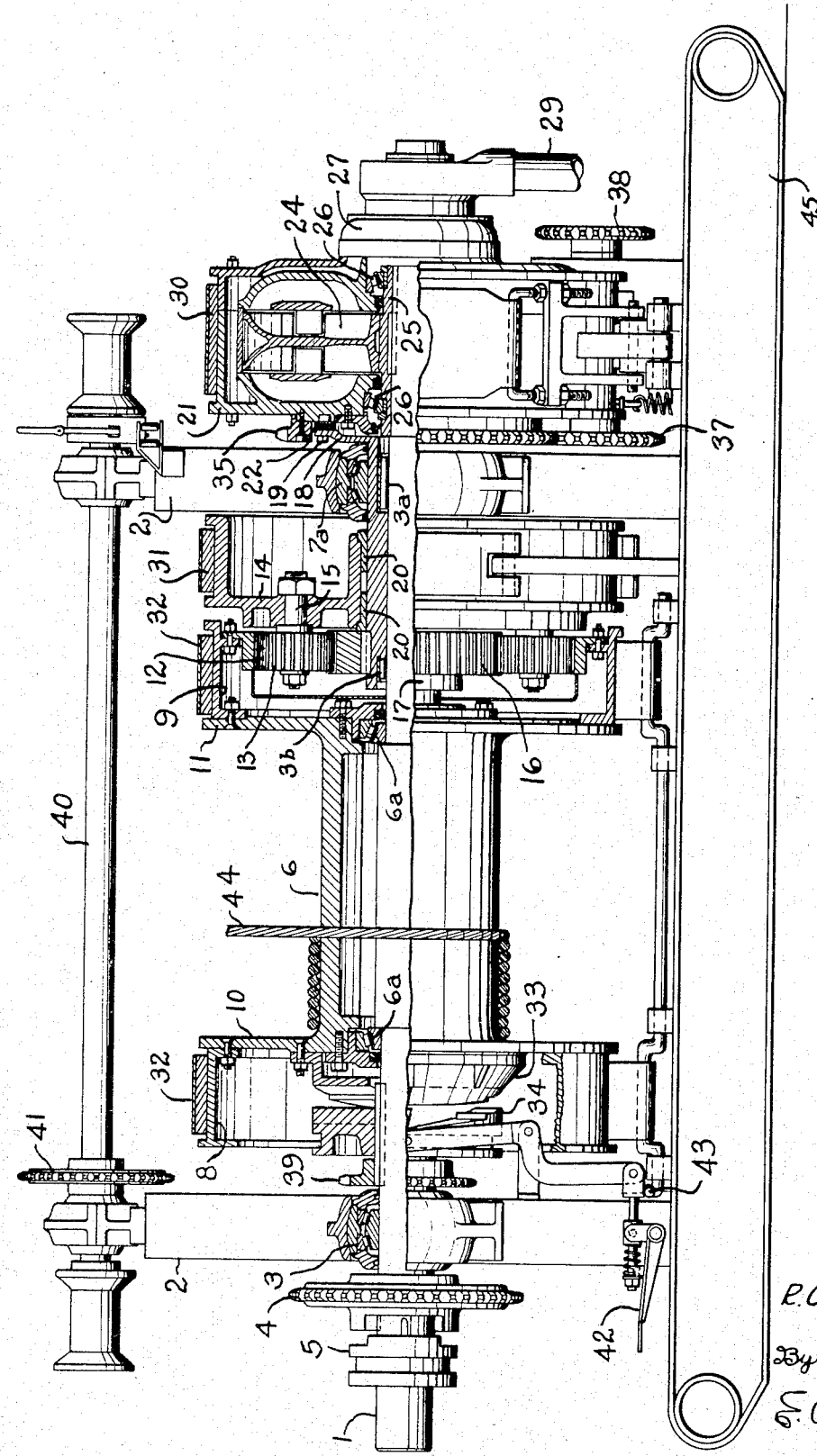
Figure 1 shows a side view of the draw-works partly in section.

Referring now more particularly to the drawings wherein like numerals of reference designate the same parts in each of the figures the numeral 1 designates a drive shaft mounted on suitable posts 2, 2 to rotate in a bearing 3 carried by one of said posts and bearings 3a and 3b within an elongated sleeve shaft 17. This last mentioned sleeve shaft is mounted to rotate in bearings 7a on the other post 2.

The shaft 1 is driven by means of a sprocket 4 which is loosely mounted thereon but which may be clutched therewith or declutched therefrom by means of a clutch 5 which is splined on said shaft 1.

There is a hoist drum 6 mounted to rotate on bearings 6a, 6a on the shaft 1. The drum 6 carries two brake drums 8, 9 which are secured to the respective end flanges 10, 11 of a hoist drum 6.

An internal gear 12 is bolted to the brake drum 9 and meshes with planetary gears 13 which are rotatably supported on a spider 14 by means of trunnions 15. The planetary gears mesh also with a central sun gear 16 which is keyed to the sleeve shaft 17 which is in turn rotatably mounted on the shaft 1 by the bearings 3a, 3b.

The spider 14 is rotatably mounted on the sleeve shaft 17 by means of bearings 20, 20. The sleeve shaft 17 is fixed to and rotates with a transmission shell 21 being bolted thereto by means of flange 18 and bolts 19. The flange 18 has a sealed connection with the transmission shell 21 by means of seal rings 22 which are clamped between the flange 18 and said shell.

There is a hydraulic transmission impeller 24 which is keyed to a hub 25, the latter being in turn keyed to the shaft 1, said impeller being located within the shell and the transmission thus porvided being substantially similar to the hydraulic transmission disclosed in my Patent No. 2,185,498, issued January 2, 1940.

The hydraulic transmission shell is mounted to rotate on the hub 25 by means of anti-friction bearings 26.

There is a header manifold 27 which is mounted adjacent the outer end of the shell and has a sealed engagement therewith and which communicates with the interior of the shell. This manifold has an inlet pipe 28 and a discharge pipe 29 through which a liquid such as water may be admitted into and discharged from the shell. As shown the inlet pipe is equipped with a suitable gate valve 23. The external periphery of the shell 21 forms a braking surface around which there is a brake band 30 applicable to control the rotation of said shell.

The periphery of the spider 14 forms also a braking surface and a brake band 31 surrounds said last mentioned braking surface and is selectively applicable thereto by conventional means not shown to control the rotation of the spider 14.

The rotation of the hoisting drum 6 may be controlled by brake bands 32 which surround the brake drums 8 and 9, respectively, and which may be set or released through a brake lever 43.

Within the brake drum 8 and attached to the end of the hoisting drum 6 there is a dental clutch member 33 and a mating clutch member 34 is splined on the shaft 1 and may be actuated into and out of engagement by means of a foot pedal 42 connected thereto in the conventional manner as shown.

A sprocket wheel 35 is bolted to the inner end of the transmission shell 21 and is provided to drive a conventional mechanical transmission 36, through a sprocket chain 35a and a sprocket wheel 37.

The transmission 36 may be utilized to drive auxiliary equipment such as a rotary table or pumps not shown. The transmission is equipped with a take-off sprocket wheel 38 for that purpose.

For the purpose of driving a line shaft 40 of the draw-works the shaft 1 is provided with a sprocket wheel 39 which is keyed to the shaft 1 and which is in alignment with the sprocket wheel 41 fixed on said line shaft. A driving sprocket chain, not shown, is intended to operate over the sprocket wheels 39, 41.

The equipment is shown mounted on a suitable framework embodying supporting skids as 45 suitably anchored together by means of cross beams as 46.

Figure 2:
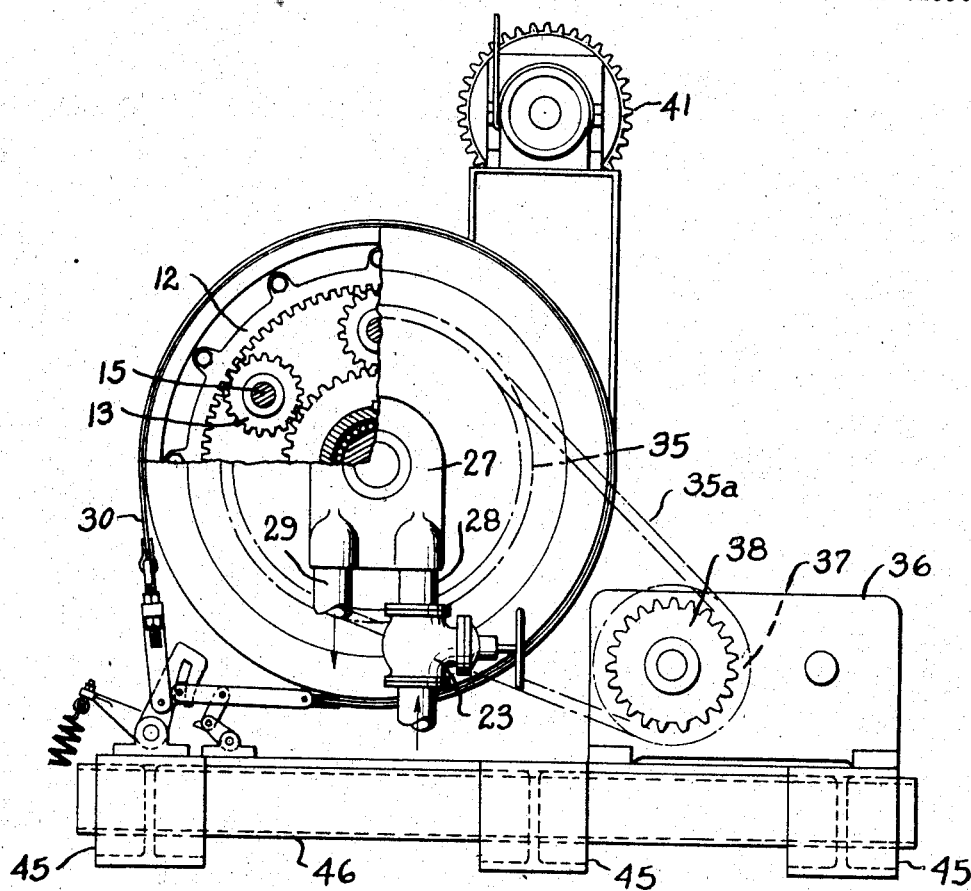
Figure 2 shows an end view, partly in section, of the draw-works shown in Figure 1.

In operation the hydraulic transmission shell 21 is filled with liquid from a suitable source of supply, not shown, through the inlet pipe 28. The load to be handled is connected to the drum 6 by means of a suitable cable 44. The load is raised by the rotation of the drum 6 in a counterclockwise direction as viewed from the end shown in Figure 2. The driving motor is connected to the shaft 1 through a suitable sprocket chain not shown, which operates over the sprocket wheel 4 and through the clutch 5 and rotates the shaft 1 and the transmission shell 21 in a clockwise direction. While the hoist is idling with no load on the drum the brake bands 30, 31 are disengaged allowing the shell 21 and spider 14 to rotate freely. The brake bands 32 are set holding the drum 6 stationary. If it be now desired to raise the load to which the cable 44 is connected by rotating the drum 6 in a counter-clockwise direction the brake band 31 is set to reduce the rotation of the spider 14 and this causes the resistance of the drum 6 against rotation to be transmitted through the internal ring 12, the planetary gears 13 and the sun gear 16 to the transmission shell 21 reducing the rotative speed of said shell and building up a differential speed between the impeller 24 and the shell 21 which increases the torque transmitted from the shaft 1 to the shell 21. When the speed of the shell is reduced sufficiently to cause the torque to equal the load on the drum 6, the brake bands 32 are released and the transmission shell then assumes the load on the drum. Further reduction in the speed of the spider 14 will decrease the speed of the shell 21 and in proportion to the gear ratios in the gear train, the speed of the drum 6 will be increased thus raising the load attached to the cable. When the load is raised as far as desired the brake bands 32 are set and the band 31 released thus taking the load off of the hydraulic transmission and motor. The shaft 1 continues to be driven by the motor at all times.

If it be desired to lower the load freely, the bands 32 are released and the load is lowered in the manner of the conventional hoist.

In case the load is heavy and it is desired to have the hydraulic transmission control the descent of the load the brake bands 32 are released allowing the load to rotate the drum 6 in a clockwise direction. The foot pedal 42 is pressed downwardly and when the speed of the drum 6 synchronizes with the speed of the shaft 1 the clutch members 33 and 34 will engage and transmit the torque of the load on the drum 6 to the shaft 1. The brake band 30 is then set to reduce the speed of the shell 21. The action of the liquid in the shell then serves to cause a resistance to the rotation of the impeller and thus to the rotation of the drum causing the hydraulic transmission to act as a hydraulic brake. When the shell 21 is brought to rest the full power of the transmission acts as a hydraulic brake to control the descent of the load and in some instances the speed of the shaft 1. In case additional brake effect is desired the brake band 31 is set to slow down the rotation of the spider and the brake band 30 is released, thus allowing the shell 21 to rotate in a direction opposite to that of the drum 6, the shaft 1, and the impeller 24 and building up greater differential speed between the impeller and shell and causing still greater resistance to the descent of the load and in some instances the speed of the shaft 1.

When the load has descended the brake bands 32 are set to bring the drum 6 to a stop allowing the shaft 1 to rotate faster than the drum and allowing the clutch 33, 34 to automatically disengage. The brake band 31 is then relieved and the shell 21 automatically reverses and rotates with the impeller and the hoist is again idling.

Heat added to the liquid during the operation before described is carried off through the circulation of the liquid from the shell 21 through the pipe 29 and cool fluid is simultaneously introduced through the pipe 28 to replace the discharged liquid.

Figure 3:
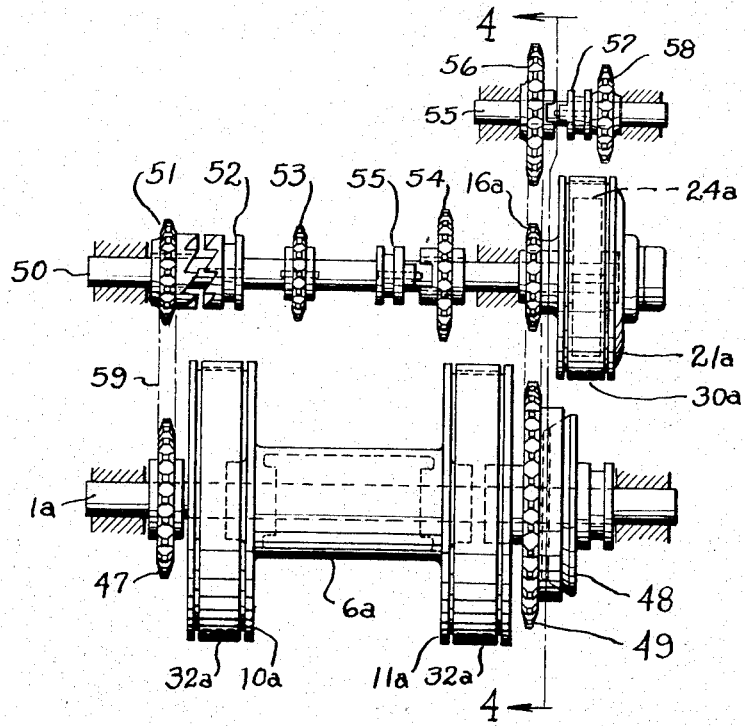
Figure 3 shows a top view of another form of the draw-works.
Figure 4:
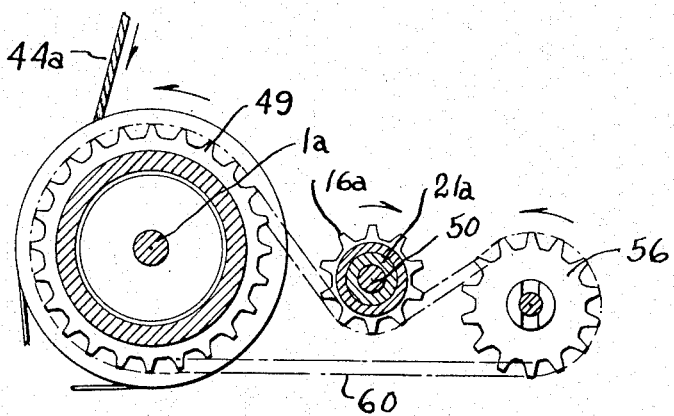
Figure 4 shows a sectional view taken on line 4—4 of Figure 3.

In Figures 3 and 4, another embodiment of the invention is shown wherein the numeral 1a designates a drum shaft. Keyed on said shaft is a sprocket 47, drum 6a, and clutch member 48, which is preferably a friction type clutch. A clutch sprocket 49 is freely rotatable on the shaft 1a and arranged to be engaged by the mating clutch member 48. Co-acting with flanges 10a, 11a of the drum 6a are brake bands 32a, 32a which may be of the same construction as the brake bands shown in Figure 1.

Positioned in parallel relationship with the drum shaft 1a is a drive shaft 50 on which is keyed clutch members 52 and 55, and a sprocket 53. Said clutches 52 and 55 selectively connect the drive shaft 50 with clutch sprockets 51 and 54 respectively. A chain 59 connects the clutch sprocket 51 and sprocket 47 on the drum shaft 1a. At the end of the driving shaft 50 is a hydraulic transmission unit which is similar in construction to the transmission unit shown in Figure 1 and disclosed in my Patent No. 2,185,498, issued January 2, 1940. This transmission unit includes a shell 21a freely rotatable on the shaft 50, a brake band 30a coacting with the periphery of the shell, and a sprocket 16a mounted on the hub of the casing. An impeller 24a in the casing is keyed to the shaft 50 and rotation of the impeller causes the casing to rotate in the manner hereinabove described.

An idler shaft 55 is rotatably mounted in parallel relationship with the driving shaft 50 and has a clutch sprocket 56 rotatably mounted thereon. A clutch member 57 is keyed to said shaft 55 and operatively connects the clutch sprocket 56 with the shaft; and a sprocket 58 is immovably mounted on the shaft 55.

As shown in Figure 4, the clutch sprockets 49 and 56 are connected by a chain 60 whose upper run passes below and engages with the sprocket 16a. A hoisting cable 44a is shown leading to the drum. The directions of rotation, when a load is being raised, of the drum 6a, sprocket 16a and clutch sprocket 56 are shown by arrows.

In operation the sprocket 54 is rotated by a suitable prime mover in a clockwise direction to raise a load which is connected to the hoist drum 6a by means of a cable 44a. The clutch 55 is engaged with the sprocket 54, rotating the shaft 50 in a clockwise direction; the impeller 24a being also rotated in a clockwise direction. Rotation of the impeller 24a causes the casing 21a to rotate, in the manner hereinbefore described; the sprocket 16a, being mounted on the casing 21a, also rotates in a clockwise direction. The chain 59 causes the sprockets 56 and 49 to rotate in a counter-clockwise direction as shown by the arrows in Figure 4. The clutch 48 is engaged causing the hoist drum 6a to rotate in a counter-clockwise direction and raise the load by winding the cable 44a on the drum. When the load has been raised sufficiently, the brake bands 32a are set to hold the hoist drum 6a and the clutch 48 disengaged, the drive shaft continuing to rotate in a clockwise direction, being kept engaged with the motor. Counter-directional power transmission means is thus provided wherein the direction of rotation of the drum is the same as that of the driving shaft when the load descends. This necessitates the rotation of the drum and shaft in opposite directions when the load is raised. The transmission means connecting the shaft and drum must be one to reverse the direction of rotation of the torque force and therefore must be counter-directional or of such construction as to reverse the rotational direction of the administered torque force about a rotational axis.

When it is desired to use the hydraulic transmission as a hydraulic brake to lower the load, the brake band 30a is applied to retard the rotation of the shell 21a. Simultaneously, the brake bands 32a are released to allow the drum 6a to rotate in a clockwise direction and to lower the load. The shafts 1a, and 50 are now rotating in the same direction, or that is, clockwise. The speed of shaft 1a increases driving the sprocket 51 until its speed is equal to the speed of shaft 50. When the said shaft and sprocket speeds are equal, the clutch 52 is engaged with the sprocket 51 so that the drum 6a then drives the shaft 50 in a clockwise direction by means of the sprocket 47 and 51, which direction is the same direction as the prime mover is rotating the shaft. The differential speed thus built up between the brake band controlled casing 21a, and the drum rotated impeller 24a, causes a dissipation of the energy of the descending load and the hydraulic transmission then acts as a hydraulic brake in controlling the descent of the load to the extent of the speed of rotation of the shaft 50. Engagement of clutch 48 and release of the brake band 30a while the drum is driving the impeller of the hydraulic transmission in a clockwise direction, simultaneously drives the casing 21a in a counter-clockwise direction, so that the hydraulic transmission acts further as a hydraulic brake to retard lowering of the load in proportion to the differential speed equal to the sum of the speeds of shaft 50 and the casing 21a. The hydraulic transmission therefore acts as a hydraulic brake without necessarily disengaging the prime mover driven sprocket 54 from the drive shaft 50; the drive shaft 50 rotating at all times in a clockwise direction.

The drawings and description are illustrative merely while the broad principle of the invention will be defined by the appended claims.

What I claim is:

1. Equipment of the character described comprising a drive shaft, an impeller fixed thereon, a rotatable shell loosely mounted on the drive shaft and containing a chamber for liquid in which the impeller is located, means through which co-action of the impeller and liquid will transmit energy from the shaft to the shell, a cable-spooling member rotatably mounted on the shaft, brake means on the shell effective to govern the rotation thereof, transmission means operatively connecting the shell and cable-spooling member, said transmission including a spider loosely mounted about the shaft and brake means effective to control the rotation of the spider.

2. Equipment of the character described comprising a drive shaft, an impeller fixed thereon, a rotatable shell loosely mounted on the drive shaft, and containing a chamber for liquid in which the impeller is located, means through which co-action of the impeller and liquid will transmit energy from the shaft to the shell, a cable-spooling member rotatably mounted on the shaft, brake means on the shell effective to govern the rotation thereof, transmission means operatively connecting the shell and cable-spooling member, said transmission including a spider loosely mounted about the shaft, brake means effective to control the rotation of the cable-spooling member.

3. Equipment of the character described comprising a drive shaft, an impeller fixed thereon, a shell enclosing the impeller and rotatably mounted on the shaft and forming a chamber for containing a fluid energy transmitting medium, a cable-spooling member on, but rotatable independently of, the shaft, said cable-spooling member having a braking surface, braking means for contact with said surface to control the rotation of the cable-spooling member, braking means arranged to control the rotation of the shell and planetary gearing about and substantially concentric with the shaft for operatively connecting the shell with the cable-spooling member.

4. Hoisting equipment comprising a driving shaft, and a load handling drum, a selectively operative counter-directional power transmission means, including a hydraulic transmission having relatively rotatable driving elements, connecting said driving shaft and said load handling drum, to cause said shaft and load handling drum to rotate in opposite directions to raise the load, and allowing them to rotate in the same direction when the load is lowered, selectively operative power transmission means adaptable for rotatably connecting said driving shaft and said load handling drum both to rotate in the same direction when lowering the load, regulatory means adapted to control the rotation of the hydraulic transmission driven element to cause said hydraulic transmission to resist the lowering of said load.

5. Hoisting equipment comprising a driving shaft, a hoisting drum supported on, but rotatable independent of, the shaft, selectively counterdirectional driving means for driving the drum including change speed mechanism in combination with hydraulic transmission on and concentric with, the shaft, and selectively operative clutch means on said shaft, both said mechanism and last mentioned means operatively connecting the shaft and drum.

6. Hoisting equipment comprising a driving shaft, a cable-spooling drum supported on, but rotatable independently of, the shaft, means for driving the shaft, selectively operative change speed mechanism including hydraulic transmission and gearing on and concentric with the shaft and selectively operative clutch means on said shaft both said mechanism and last mentioned means operatively connecting the shaft and drum.

REXFORD O. ANDERSON.